(12) United States Patent
Cheng et al.

(10) Patent No.: US 12,232,040 B2
(45) Date of Patent: Feb. 18, 2025

(54) USING A DORMANCY TIMER FOR SWITCHING TO A DORMANT BANDWIDTH PART

(71) Applicant: QUALCOMM Incorporated, San Diego, CA (US)

(72) Inventors: Peng Cheng, Beijing (CN); Prasad Reddy Kadiri, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/753,380

(22) PCT Filed: Oct. 2, 2019

(86) PCT No.: PCT/CN2019/109795
§ 371 (c)(1),
(2) Date: Mar. 1, 2022

(87) PCT Pub. No.: WO2021/062859
PCT Pub. Date: Apr. 8, 2021

(65) Prior Publication Data
US 2022/0353817 A1 Nov. 3, 2022

(51) Int. Cl.
*H04W 72/044* (2023.01)
*H04W 52/02* (2009.01)

(52) U.S. Cl.
CPC ... *H04W 52/0235* (2013.01); *H04W 52/0274* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2019/0124558 A1 | 4/2019 | Ang et al. | |
| 2019/0190682 A1 | 6/2019 | Kadiri et al. | |
| 2019/0208429 A1* | 7/2019 | Hong | H04L 5/001 |
| 2019/0254110 A1 | 8/2019 | He et al. | |
| 2019/0297577 A1* | 9/2019 | Lin | H04W 52/0235 |
| 2021/0021397 A1* | 1/2021 | Kim | H04W 76/27 |

(Continued)

FOREIGN PATENT DOCUMENTS

CN 109963296 A 7/2019

OTHER PUBLICATIONS

CMCC: "UE States in NR", 3GPP TSG-RAN WG2 Meeting #95bis, R2-167070 Kaohsiung, Oct. 10-14, 2016, Oct. 14, 2016 (Oct. 14, 2016), pp. 1-5, 6 Pages.

(Continued)

*Primary Examiner* — Kodzovi Acolatse
(74) *Attorney, Agent, or Firm* — Harrity & Harrity, LLP (57) ABSTRACT

Various aspects of the present disclosure generally relate to wireless communication. In some aspects, a user equipment (UE) may receive a configuration that indicates a duration of a dormancy timer for switching from an active bandwidth part to a dormant bandwidth part configured for the UE; start or restart the dormancy timer based at least in part on a determination that a condition is satisfied; and switch to the dormant bandwidth part based at least in part on a determination that the dormancy timer has expired. Numerous other aspects are provided.

20 Claims, 7 Drawing Sheets

(56) References Cited

U.S. PATENT DOCUMENTS

2022/0116923 A1* 4/2022 Kim ................ H04L 5/0098
2024/0064785 A1* 2/2024 Tsuboi ............. H04W 76/25

OTHER PUBLICATIONS

International Search Report and Written Opinion—PCT/CN2019/109795—ISAEPO—Jul. 3, 2020.

Qualcomm Incorporated, et al., "Discussion on Fast SCell Activation based on RAN1/RAN4 reply LS", 3GPP TSG RAN WG2 Meeting #107b, R2-1912195, Chongqing, China, Sep. 14-18, 2019 Sep. 18, 2019 (Sep. 18, 2019), pp. 3-5, pp. 1-15.

ZTE Corporation, et al., "Further Consideration on Fast SCell Activation", 3GPP TSG-RAN WG2 Meeting #107bis, R2-1913490, Chongqing, China, Sep. 14-18, 2019, Sep. 18, 2019 (Sep. 18, 2019), pp. 6-8, 9 Pages.

Qualcomm Incorporated: "UE Adaptation to the Traffic and UE Power Consumption Characteristics", 3GPP TSG-RAN WG1 Ad-Hoc Meeting 1901, R1-1900911, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, 24 Pages, Jan. 20, 2019, XP051593757, Chapters 1. 2, sections 1-8, pp. 1-14, p. 14-p. 18, figure 1, p. 22-p. 23.

Supplementary European Search Report—EP19947822—Search Authority—The Hague—May 9, 2023.

\* cited by examiner

USING A DORMANCY TIMER FOR SWITCHING TO A DORMANT BANDWIDTH PART

CROSS-REFERENCE TO RELATED APPLICATION

This Patent Application is a 371 national stage of PCT Application No. PCT/CN2019/109795 filed on Oct. 2, 2019, entitled "USING A DORMANCY TIMER FOR SWITCHING TO A DORMANT BANDWIDTH PART," which is hereby expressly incorporated by reference herein.

FIELD OF THE DISCLOSURE

Aspects of the present disclosure generally relate to wireless communication and to techniques and apparatuses for using a dormancy timer for switching to a dormant bandwidth part.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration that indicates a duration of a dormancy timer for switching from an active bandwidth part to a dormant bandwidth part configured for the UE; starting or restarting the dormancy timer based at least in part on a determination that a condition is satisfied; and switching to the dormant bandwidth part based at least in part on a determination that the dormancy timer has expired.

In some aspects, a method of wireless communication, performed by a UE, may include receiving a configuration that indicates a duration of a dormancy timer for switching from a default bandwidth part or an initial bandwidth part to a dormant bandwidth part configured for the UE; starting or restarting the dormancy timer based at least in part on a determination that a condition is satisfied; and switching to the dormant bandwidth part based at least in part on a determination that the dormancy timer has expired.

In some aspects, a UE for wireless communication may include memory and one or more processors operatively coupled to the memory. The memory and the one or more processors may be configured to receive a configuration that indicates a duration of a dormancy timer for switching from an active bandwidth part to a dormant bandwidth part configured for the UE; start or restart the dormancy timer based at least in part on a determination that a condition is satisfied; and switch to the dormant bandwidth part based at least in part on a determination that the dormancy timer has expired.

In some aspects, a UE for wireless communication may include memory and one or more processors operatively coupled to the memory. The memory and the one or more processors may be configured to receive a configuration that indicates a duration of a dormancy timer for switching from a default bandwidth part or an initial bandwidth part to a dormant bandwidth part configured for the UE; start or restart the dormancy timer based at least in part on a determination that a condition is satisfied; and switch to the dormant bandwidth part based at least in part on a determination that the dormancy timer has expired.

In some aspects, a non-transitory computer-readable medium may store one or more instructions for wireless communication. The one or more instructions, when executed by one or more processors of a UE, may cause the one or more processors to: receive a configuration that indicates a duration of a dormancy timer for switching from an active bandwidth part to a dormant bandwidth part configured for the UE; start or restart the dormancy timer based at least in part on a determination that a condition is satisfied; and switch to the dormant bandwidth part based at least in part on a determination that the dormancy timer has expired.

In some aspects, a non-transitory computer-readable medium may store one or more instructions for wireless communication. The one or more instructions, when executed by one or more processors of a UE, may cause the one or more processors to: receive a configuration that indicates a duration of a dormancy timer for switching from a default bandwidth part or an initial bandwidth part to a dormant bandwidth part configured for the UE; start or restart the dormancy timer based at least in part on a determination that a condition is satisfied; and switch to the dormant bandwidth part based at least in part on a determination that the dormancy timer has expired.

In some aspects, an apparatus for wireless communication may include means for receiving a configuration that indicates a duration of a dormancy timer for switching from an active bandwidth part to a dormant bandwidth part configured for the apparatus; means for starting or restarting the dormancy timer based at least in part on a determination that a condition is satisfied; and means for switching to the dormant bandwidth part based at least in part on a determination that the dormancy timer has expired.

In some aspects, an apparatus for wireless communication may include means for receiving a configuration that indicates a duration of a dormancy timer for switching from a default bandwidth part or an initial bandwidth part to a dormant bandwidth part configured for the apparatus; means for starting or restarting the dormancy timer based at least in part on a determination that a condition is satisfied; and means for switching to the dormant bandwidth part based at least in part on a determination that the dormancy timer has expired.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
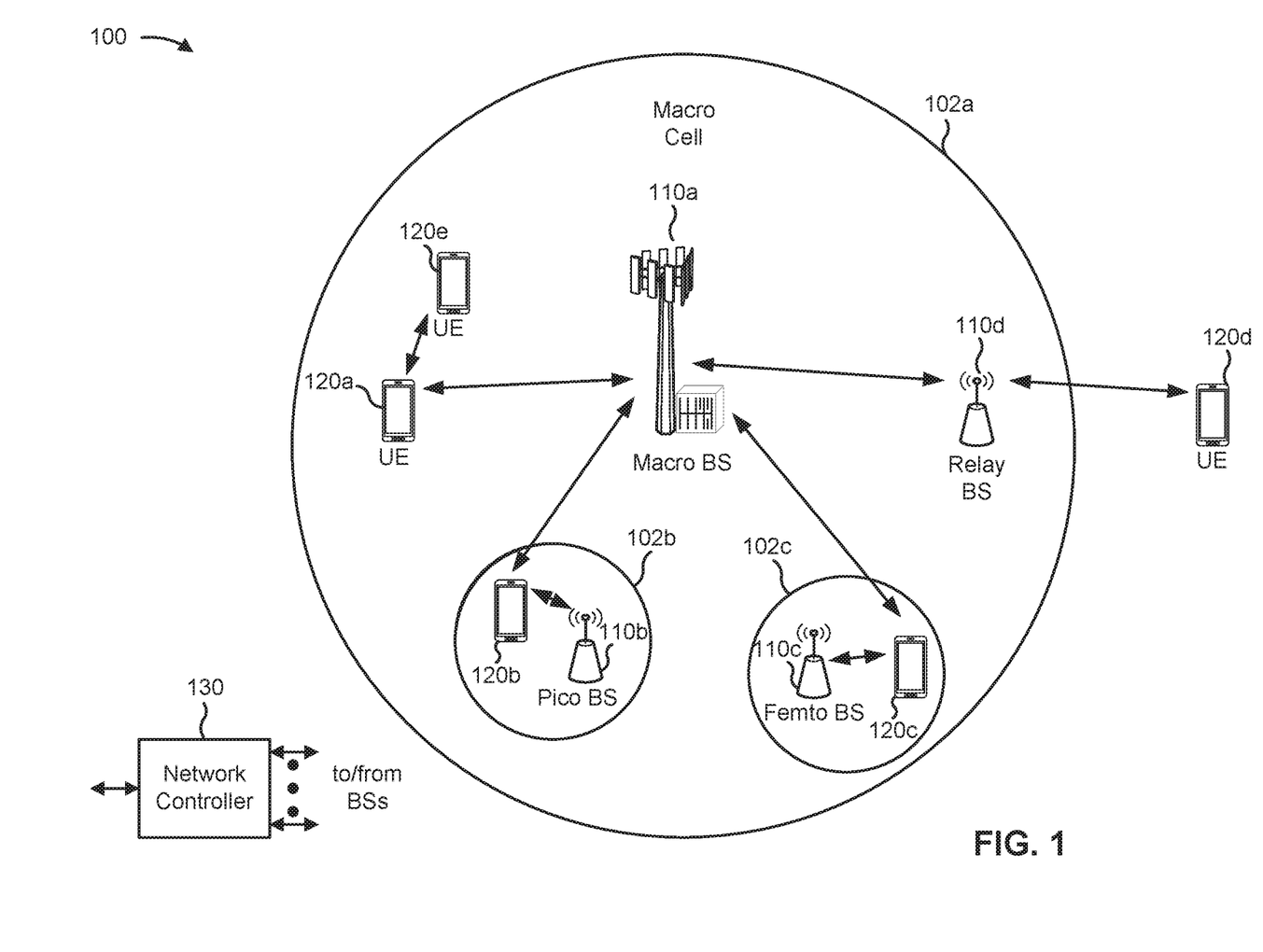
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
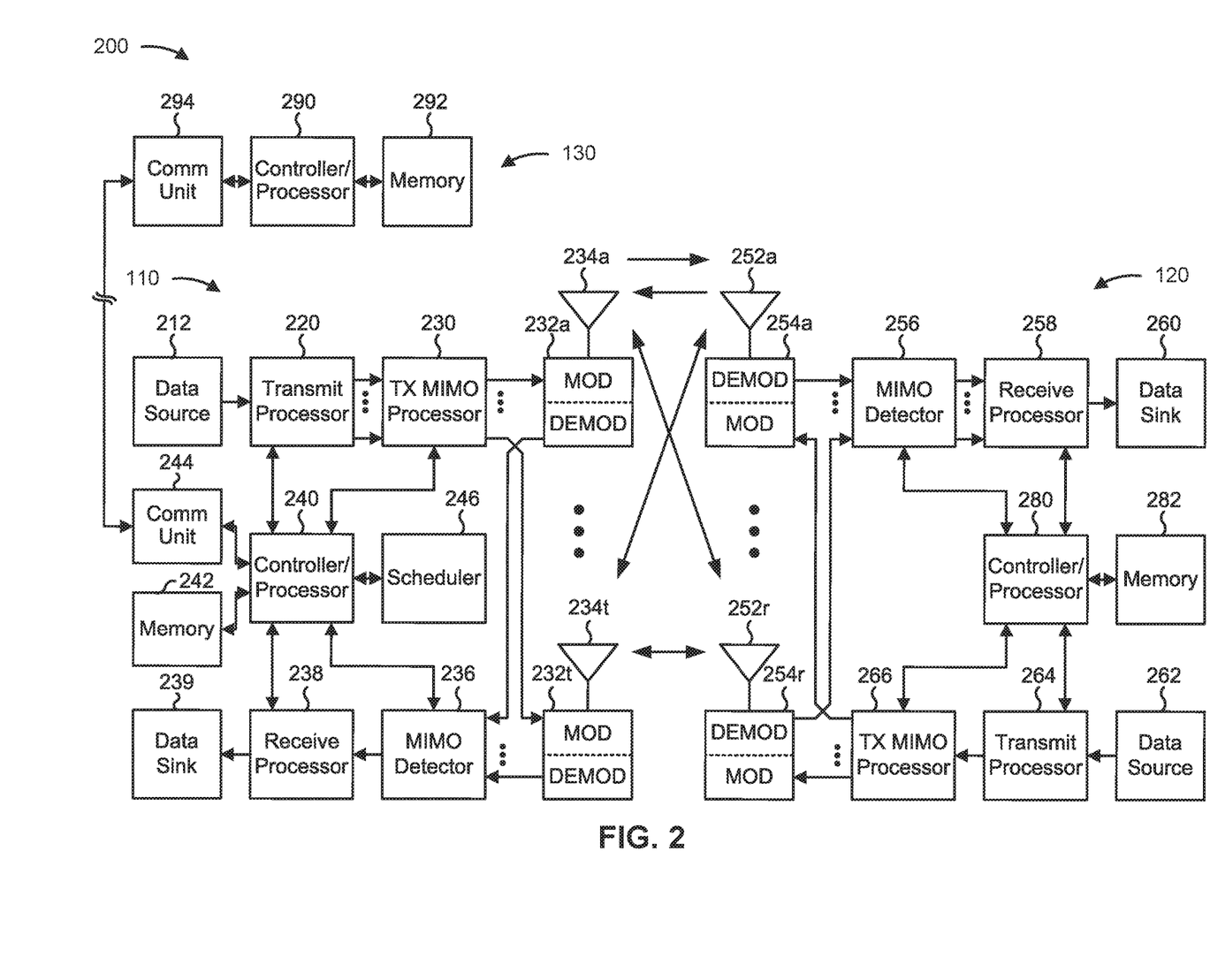
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using a dormancy timer for switching to a dormant bandwidth part, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving a configuration that indicates a duration of a dormancy timer for switching from an active bandwidth part to a dormant bandwidth part configured for the UE 120; means for starting or restarting the dormancy timer based at least in part on a determination that a condition is satisfied; means for switching to the dormant bandwidth part based at least in part on a determination that the dormancy timer has expired; and/or the like. Additionally, or alternatively, UE 120 may include means for receiving a configuration that indicates a duration of a dormancy timer for switching from a default bandwidth part or an initial bandwidth part to a dormant bandwidth part configured for the UE 120; means for starting or restarting the dormancy timer based at least in part on a determination that a condition is satisfied; means for switching to the dormant bandwidth part based at least in part on a determination that the dormancy timer has expired; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
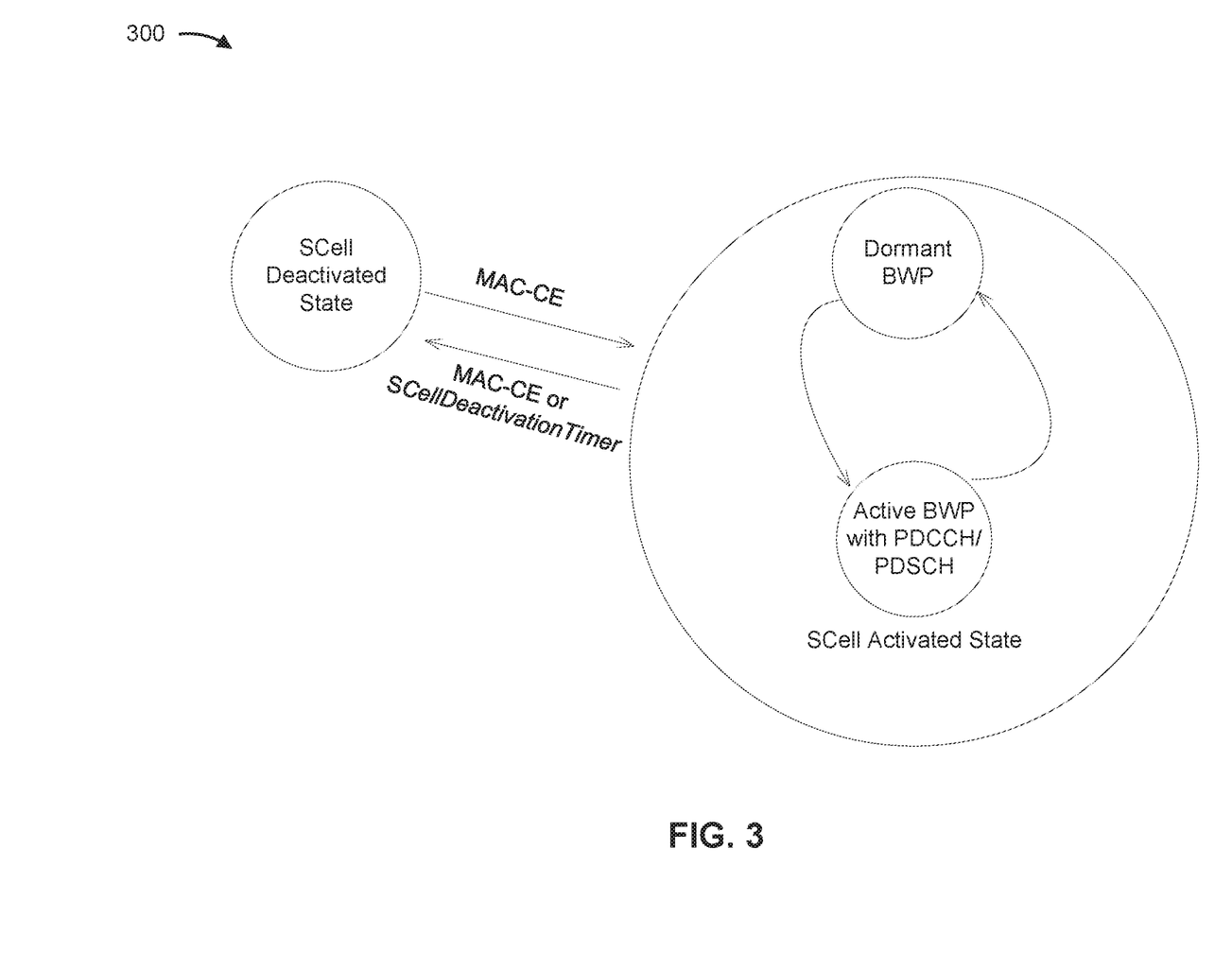
FIG. 3 is a diagram illustrating an example of switching between an active bandwidth part and a dormant bandwidth part for fast secondary cell activation, in accordance with various aspects of the present disclosure.

FIG. 3 is a diagram illustrating an example 300 of switching between an active bandwidth part and a dormant bandwidth part for fast secondary cell activation, in accordance with various aspects of the present disclosure.

In NR, a UE may be configured with one or more bandwidth parts (BWPs). A BWP may have a bandwidth that is less than a total system bandwidth of a wireless communication system being used by the UE. For example, some UEs may not support communications on the entire system bandwidth, and may be configured with a BWP for communication. Additionally, or alternatively, a UE may switch from wideband communications to narrowband communications on a BWP to conserve UE resources (e.g., processing power, memory, battery power, and/or the like).

An active BWP may refer to a BWP that is currently being used by a UE to communicate, such as to transmit and/or receive a message. In some aspects, the UE may be limited to a single active downlink BWP (e.g., a BWP used for downlink communication) and a single active uplink BWP (e.g., a BWP used for uplink communication). The UE may be configured with multiple BWPs (e.g., up to four BWPs), and may switch between the BWPs for a serving cell based at least in part on a message received from a base station, such as a radio resource control (RRC) message, downlink control information (DCI), and/or the like.

In some aspects, the UE may be configured with a default BWP. For example, a base station may indicate a default BWP to the UE in an RRC message. Furthermore, the UE may be configured with a BWP inactivity timer that controls switching to the default BWP. The UE may start or restart the BWP inactivity timer upon switching to a BWP (e.g., other than the default BWP) and/or upon transmitting or receiving data in the BWP. When the BWP inactivity timer expires (e.g., when the UE is on an active BWP other than the default BWP and when the UE has not transmitted or received data for the duration of the BWP inactivity timer), then the UE may switch from an active BWP to the default BWP. The default BWP may have a narrow bandwidth, and the UE may perform physical downlink control channel (PDCCH) monitoring on the default BWP. In some aspects, the UE may operate in a discontinuous reception (DRX) mode on the default BWP. Thus, the UE may enter a sleep state and may periodically exit the sleep state and enter an active state to perform PDCCH monitoring on the default BWP.

In some aspects, the UE may be configured with a default BWP during RRC configuration. If the UE is not configured with a default BWP during RRC configuration, then the UE may use an initial BWP as the default BWP. An initial BWP may refer to a BWP used for initial access when the UE is in idle mode (e.g., prior to the UE being in connected mode and receiving an RRC message that indicates the default BWP). The UE may use the initial BWP for performing a random access procedure for initial network access.

In NR carrier aggregation, the UE may communicate with a base station using a primary cell (PCell) and one or more secondary cells (SCells). Due to changing channel conditions, a set of active SCells (e.g., the SCells currently being used by the UE to communicate with the base station) may change over time. To reduce the time needed to switch to a new SCell (and therefore reduce latency), the UE may perform channel measurement and reporting for deactivated SCells. As a result, when a trigger is detected to activate an SCell, the base station can use the previously reported measurements to select an SCell to be activated, rather than requesting the UE to perform channel measurements upon detecting the trigger. This reduces SCell activation latency. However, the signaling associated with this type of fast SCell activation is complex and may consume network resources (e.g., for communication of one or more medium access control (MAC) control elements (CEs) (MAC-CEs) used for SCell transitions), UE resources, and base station resources. Some techniques and apparatuses described herein permit fast SCell activation using a dormant BWP, and the UE may switch to the dormant BWP using a dormancy timer described herein. Using a dormant BWP for fast SCell activation may reduce complexity of SCell activation, may conserve network resources, may conserve UE resources, and/or may conserve base station resources.

As shown in FIG. 3, a UE may transition from an SCell deactivated state to an SCell activated state for an SCell based at least in part on receiving, from a base station, a MAC-CE that instructs the UE to activate the SCell. As further shown, the UE may transition from the SCell activated state to the SCell deactivated state for an SCell based at least in part on receiving, from a base station, a MAC-CE that instructs the UE to deactivate the SCell, or based at least in part on expiration of an SCell deactivation timer (e.g., due to inactivity of communication on the SCell).

When an SCell of the UE is in the SCell activated state, the UE may transition between an active BWP of the SCell and a dormant BWP of the SCell. When communicating using the active BWP, the UE may receive control information on the PDCCH and may receive data on a physical downlink shared channel (PDSCH). When communicating using the dormant BWP, the UE may perform channel measurement and reporting, but may refrain from monitoring a PDCCH. For example, when on the dormant BWP, the UE may perform channel state information (CSI) measurements, radio resource management (RRM) measurements (e.g., CQI measurements, RSRP measurements, RSRQ measurements, RSSI measurements, and/or the like), beam management (BM) measurements, automatic gain control (AGC) measurements, and/or the like. By performing these measurements for the SCell in a dormant state (e.g., on a dormant BWP of the SCell), the UE may conserve UE resources while assisting the base station with fast SCell activation.

In some cases, the base station may instruct the UE to transition from an active BWP of an SCell to a dormant BWP of the SCell, such as by transmitting DCI to the UE. However, this uses network resources and requires signaling overhead. Some techniques and apparatuses described herein permit the UE to switch to the dormant BWP using a dormancy timer, thereby conserving network resources and resources of the base station that would otherwise be used to transmit DCI. In some cases, the UE may use an inactivity timer, described above in connection with a default BWP, to switch to the dormant BWP (e.g., by using the default BWP as the dormant BWP, or vice versa). However, the default BWP and the dormant BWP have different characteristics. For example, the UE performs PDCCH monitoring on the default BWP, which consumes additional UE resources as compared to the dormant BWP, on which the UE may refrain from performing PDCCH monitoring. Some techniques and apparatuses described herein provide a dormancy timer for controlling switching to the dormant BWP, while still permitting the UE to use an inactivity timer to switch to the default BWP. Because the dormant BWP and the default BWP are designed for different use cases, the techniques and apparatuses described herein permit the UE to take advantage of these use cases by switching to the appropriate BWP (e.g., the default BWP or the dormant BWP). Furthermore, some techniques and apparatuses described herein permit the UE to resolve conflicts between the dormancy timer and the inactivity timer.

As indicated above, FIG. 3 is provided as an example. Other examples may differ from what is described with regard to FIG. 3.

Figure 4:
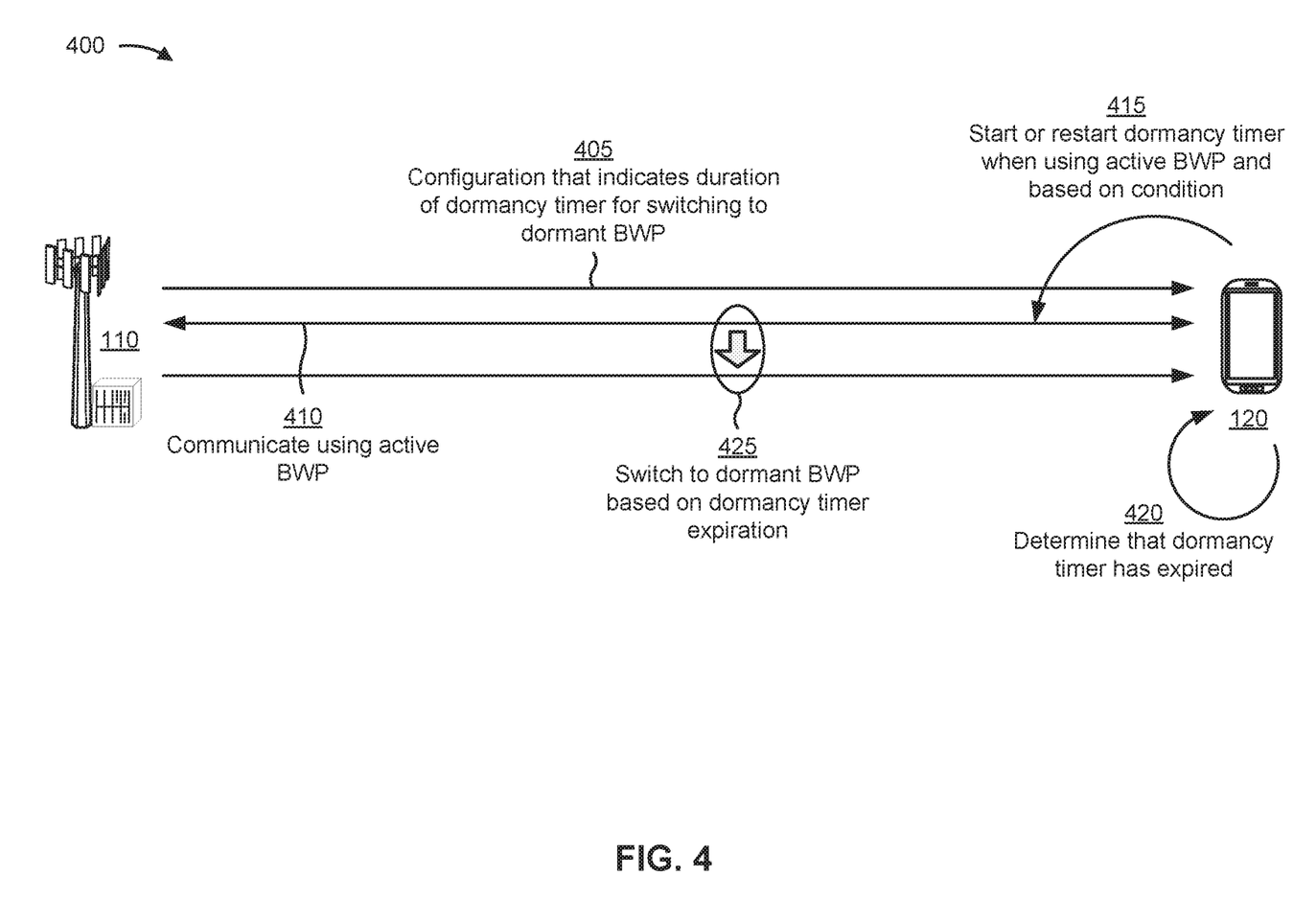
FIG. 4 is a diagram illustrating an example of using a dormancy timer for switching to a dormant bandwidth part, in accordance with various aspects of the present disclosure.

FIG. 4 is a diagram illustrating an example 400 of using a dormancy timer for switching to a dormant bandwidth part, in accordance with various aspects of the present disclosure.

As shown in FIG. 4, a base station 110 and a UE 120 may communicate with one another. As shown by reference number 405, the UE 120 may receive, from the base station 110, a configuration that indicates a duration of a dormancy timer for switching to a dormant BWP. In some aspects, the dormant BWP may be configured by the base station 110 for the UE 120 (e.g., in the configuration). In some aspects, the configuration may be included in an RRC message, such as an RRC configuration message, an RRC reconfiguration message, and/or the like.

In some aspects, the configuration may be specific to an SCell configured for the UE 120. In this case, all BWPs configured for the SCell may be associated with a dormancy timer having the same duration. In some aspects, different SCells may be associated with dormancy timers with different durations. Alternatively, different SCells may be configured with a dormancy timer having the same duration across SCells.

As shown by reference number 410, the UE 120 and the base station 110 may communicate via an active BWP. The active BWP may be different from the dormant BWP. The active BWP may be, for example, a default BWP, an initial BWP, or an active BWP other than the default BWP, the initial BWP, and the dormant BWP. In some aspects, the UE 120 may monitor for PDCCH communications on the active BWP.

As shown by reference number 415, the UE 120 may start or restart the dormancy timer (e.g., by setting the dormancy timer to the configured duration) when using the active BWP. For example, the UE 120 may start or restart the dormancy timer upon switching to the active BWP. Additionally, or alternatively, the UE 120 may start or restart the dormancy timer based at least in part on determining that a condition is satisfied. In some aspects, the condition may indicate communication activity on the active BWP.

In some aspects, the condition may include reception of an instruction (e.g., in a PDCCH communication) to switch from the active bandwidth part to a bandwidth part other than the dormant bandwidth part (sometimes referred to as a non-dormant BWP). For example, the condition may include an instruction to switch from a first non-dormant BWP to a second non-dormant BWP. In some aspects, the UE 120 may start or restart the dormancy timer based at least in part on receiving the instruction. Additionally, or alternatively, the UE 120 may start or restart the dormancy timer based at least in part on switching to the second non-dormant BWP.

Additionally, or alternatively, the condition may include reception of a PDCCH communication that includes a downlink assignment or an uplink grant on the active BWP (e.g., a non-dormant BWP). In some aspects, the PDCCH communication is scrambled using a cell radio network temporary identifier (C-RNTI) or a configured scheduling RNTI (CS-RNTI). The PDCCH communication may include a downlink assignment (e.g., may schedule a downlink data communication) or may include an uplink grant (e.g., may schedule an uplink data communication). Thus, the PDCCH communication may dynamically schedule a data communication (e.g., using DCI). In some aspects, the UE 120 may start or restart the dormancy timer based at least in part on receiving the PDCCH communication. Additionally, or alternatively, the UE 120 may start or restart the dormancy timer based at least in part on transmitting uplink data scheduled by the PDCCH communication or receiving downlink data scheduled by the PDCCH communication.

Additionally, or alternatively, the condition may include transmission or reception of data (e.g., a MAC protocol data unit (PDU)) in a preconfigured resource. For example, the UE 120 may receive a configuration (e.g., in an RRC message) for a configured grant uplink communication and/or for a semi-persistent scheduling (SPS) downlink communication. In this case, the UE 120 would not receive DCI that dynamically schedules a data communication, which would trigger starting or restarting of the dormancy timer. As a result, the transmission or reception of data in a preconfigured resource may cause the UE 120 to start or restart the dormancy timer. For example, the UE 120 may start or restart the dormancy timer based at least in part on transmission of a MAC PDU for a configured grant uplink communication on the active bandwidth part. Additionally, or alternatively, the UE 120 may start or restart the dormancy timer based at least in part on reception of a MAC PDU for an SPS downlink communication on the active bandwidth part.

Additionally, or alternatively, the condition may include expiration of an inactivity timer for switching from the active BWP to a default BWP. In this case, the UE 120 may start or restart the dormancy timer based at least in part on expiration of the inactivity timer. Additionally, or alternatively, the UE 120 may start or restart the dormancy timer upon switching to the default BWP. In some aspects, the UE 120 may start or restart the dormancy timer upon expiration of the inactivity timer if the dormancy timer and the inactivity timer do not expire at the same time (e.g., simultaneously). Additional details regarding simultaneous expiration of the dormancy timer and the inactivity timer are described below in connection with FIG. 5.

In some aspects, the UE 120 may stop the dormancy timer. For example, if the UE 120 switches to the dormant BWP, then the UE 120 may stop the dormancy timer. Additionally, or alternatively, if the UE is performing a random access procedure (e.g., for a serving cell for which the dormancy timer is configured), then the UE 120 may stop the dormancy timer. Additionally, or alternatively, if the SCell associated with the dormancy timer is released (e.g., due to reception of a deactivation MAC-CE), then the UE 120 may stop the dormancy timer (and/or an inactivity timer) associated with the SCell. Additionally, or alternatively, if a deactivation timer associated with the SCell expires, then the UE 120 may stop the dormancy timer (and/or an inactivity timer) associated with the SCell.

As shown by reference number 420, the UE 120 may determine that the dormancy timer has expired. For example, the UE 120 may determine that a configured duration for the dormancy timer has elapsed. As shown by reference number 425, the UE 120 may switch to the dormant BWP based at least in part on determining that the dormancy timer has expired. For example, the UE 120 may switch from an active BWP (e.g., a non-dormant BWP) to the dormant BWP based at least in part on expiration of the dormancy timer. If the active BWP is the default BWP, then the UE 120 may switch from the default BWP to the dormant BWP based at least in part on expiration of the dormancy timer. If the active BWP is the initial BWP, then the UE 120 may switch from the initial BWP to the dormant BWP based at least in part on expiration of the dormancy timer.

In some aspects, after switching to the dormant BWP, the UE 120 may start or restart an inactivity timer associated with switching to the default BWP (or the initial BWP). For example, if the dormant BWP (and/or the dormancy timer) has a higher priority than the default BWP (and/or the inactivity timer), then the UE 120 may start the dormancy timer after switching to an active BWP, may switch from the active BWP to the dormant BWP upon expiration of the dormancy timer, may start the inactivity timer after switching to the dormant BWP, and may switch from the dormant BWP to the default BWP upon expiration of the inactivity timer. In some aspects, if the dormant BWP (and/or the dormancy timer) has a lower priority than the default BWP (and/or the inactivity timer), then the UE 120 may start the inactivity timer after switching to an active BWP, may switch from the active BWP to the default BWP upon expiration of the inactivity timer, may start the dormancy timer after switching to the default BWP, and may switch from the default BWP to the dormant BWP upon expiration of the dormancy timer.

In some aspects, the active BWP in FIG. 4 may be a BWP other than the default BWP, other than the initial BWP, and other than the dormant BWP. In this case, the dormancy timer may be configured to run for only a BWP other than the default BWP, other than the initial BWP, and other than the dormant BWP. Alternatively, the active BWP in FIG. 4 may be any BWP other than the dormant BWP (e.g., and may include the default BWP and/or the initial BWP). In this case, the dormancy timer may be configured to run for any BWP other than the dormant BWP. Alternatively, the active BWP in FIG. 4 may be only the default BWP and/or the initial BWP, and may not include any BWP other than the default BWP and/or the initial BWP. In this case, the dormancy timer may be configured to run for only the default BWP and/or the initial BWP, and not for any other BWP. Although some aspects are described herein in connection with a default BWP, these aspects may also apply to an initial BWP (e.g., when the UE 120 is not configured with a default BWP and/or uses the initial BWP as the default BWP).

By using the dormancy timer described herein, the UE 120 may control switching to the dormant BWP while still using a separate inactivity timer to switch to the default BWP. Because the dormant BWP and the default BWP are designed for different use cases, the techniques and apparatuses described herein permit the UE 120 to take advantage of these use cases by switching to the appropriate BWP (e.g., the default BWP or the dormant BWP).

As indicated above, FIG. 4 is provided as an example. Other examples may differ from what is described with regard to FIG. 4.

Figure 5:
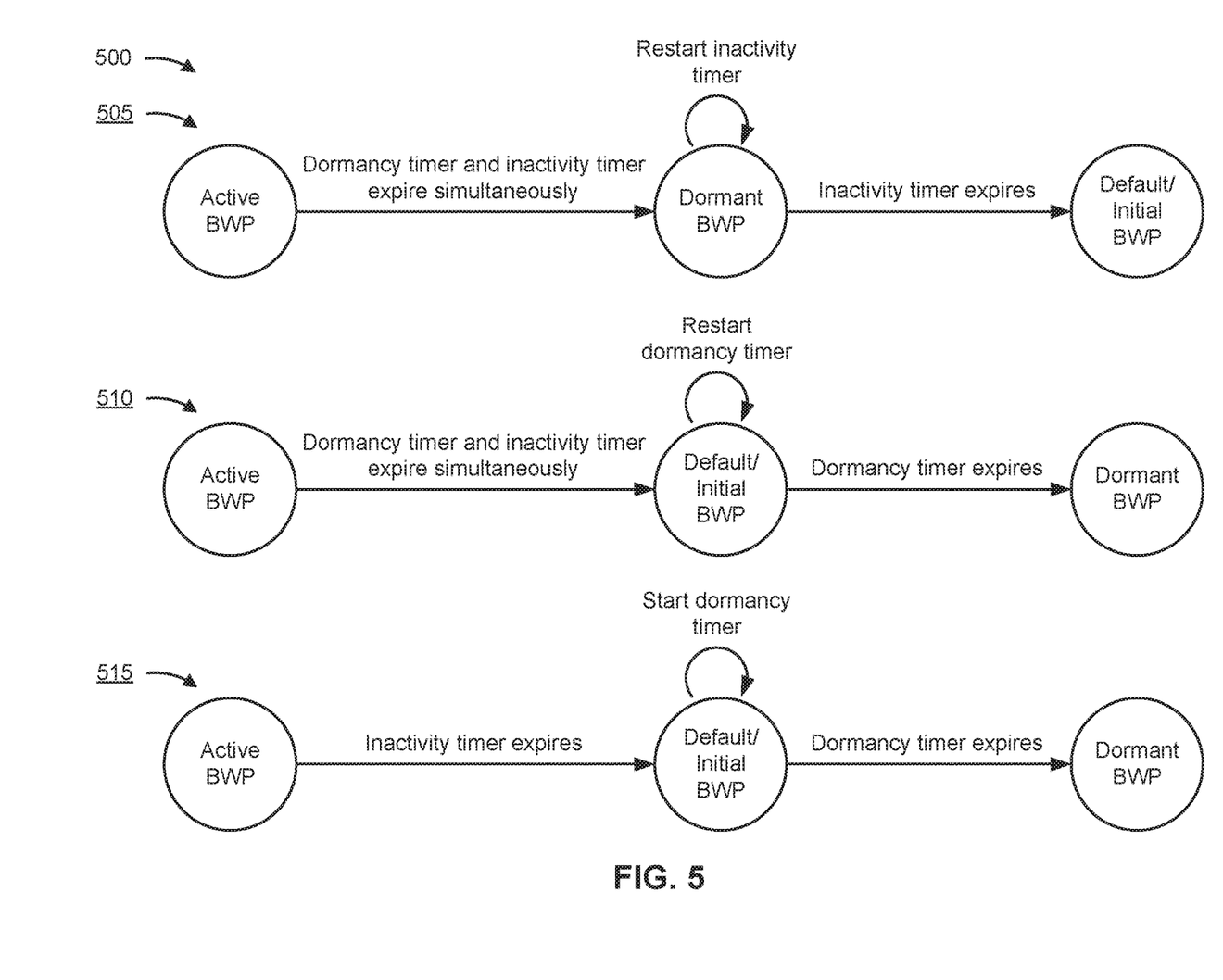
FIG. 5 is a diagram illustrating another example of using a dormancy timer for switching to a dormant bandwidth part, in accordance with various aspects of the present disclosure.

FIG. 5 is a diagram illustrating examples 500 of using a dormancy timer for switching to a dormant bandwidth part, in accordance with various aspects of the present disclosure. FIG. 5 shows three examples for handling simultaneous expiration of a dormancy timer and an inactivity timer. The dormancy timer and the inactivity timer are described in more detail above in connection with FIG. 3 and FIG. 4. In some aspects, the dormancy timer and the inactivity timer may be configured with a same duration and may expire at the same time. Alternatively, the dormancy timer and the inactivity timer may be configured with different durations, but may expire at the same time due to restarting and/or stopping one or both of the timers.

In a first example 505, if the dormancy timer and the inactivity timer expire simultaneously, then the UE 120 switches from an active BWP to a dormant BWP. Upon switching to the dormant BWP, the UE 120 may restart the inactivity timer. Upon expiration of the inactivity timer when on the dormant BWP, the UE 120 switches to the default BWP (or the initial BWP).

In a second example 510, if the dormancy timer and the inactivity timer expire simultaneously, then the UE 120 switches from an active BWP to a default BWP (or an initial BWP). Upon switching to the default BWP (or the initial BWP), the UE 120 may restart the dormancy timer. Upon expiration of the dormancy timer when on the default BWP (or the initial BWP), the UE 120 switches to the dormant BWP.

In some aspects, the UE 120 may receive a configuration (e.g., from a base station 110) that indicates whether to operate as described in the first example 505 or the second example 510. For example, the configuration may indicate whether the UE 120 is to switch to the dormant BWP or is to switch to the default BWP (or the initial BWP) if the dormancy timer and the inactivity timer expire at the same time.

In a third example 515, the dormancy timer is configured for only a default BWP (and/or an initial BWP), and is not configured for any BWP other than the default BWP (and/or the initial BWP). In this case, the dormancy timer and the inactivity timer cannot expire simultaneously because the dormancy timer only runs when the UE 120 is on the default BWP (or the initial BWP), and the inactivity timer does not run when the UE 120 is on the default BWP (or the initial BWP). In this case, the UE 120 switches from an active BWP to the default BWP (or the initial BWP) upon expiration of the inactivity timer. Upon switching to the default BWP (or the initial BWP), the UE 120 may start the dormancy timer. Upon expiration of the dormancy timer when on the default BWP (or the initial BWP), the UE 120 switches to the dormant BWP.

As indicated above, FIG. 5 is provided as an example. Other examples may differ from what is described with regard to FIG. 5.

Figure 6:
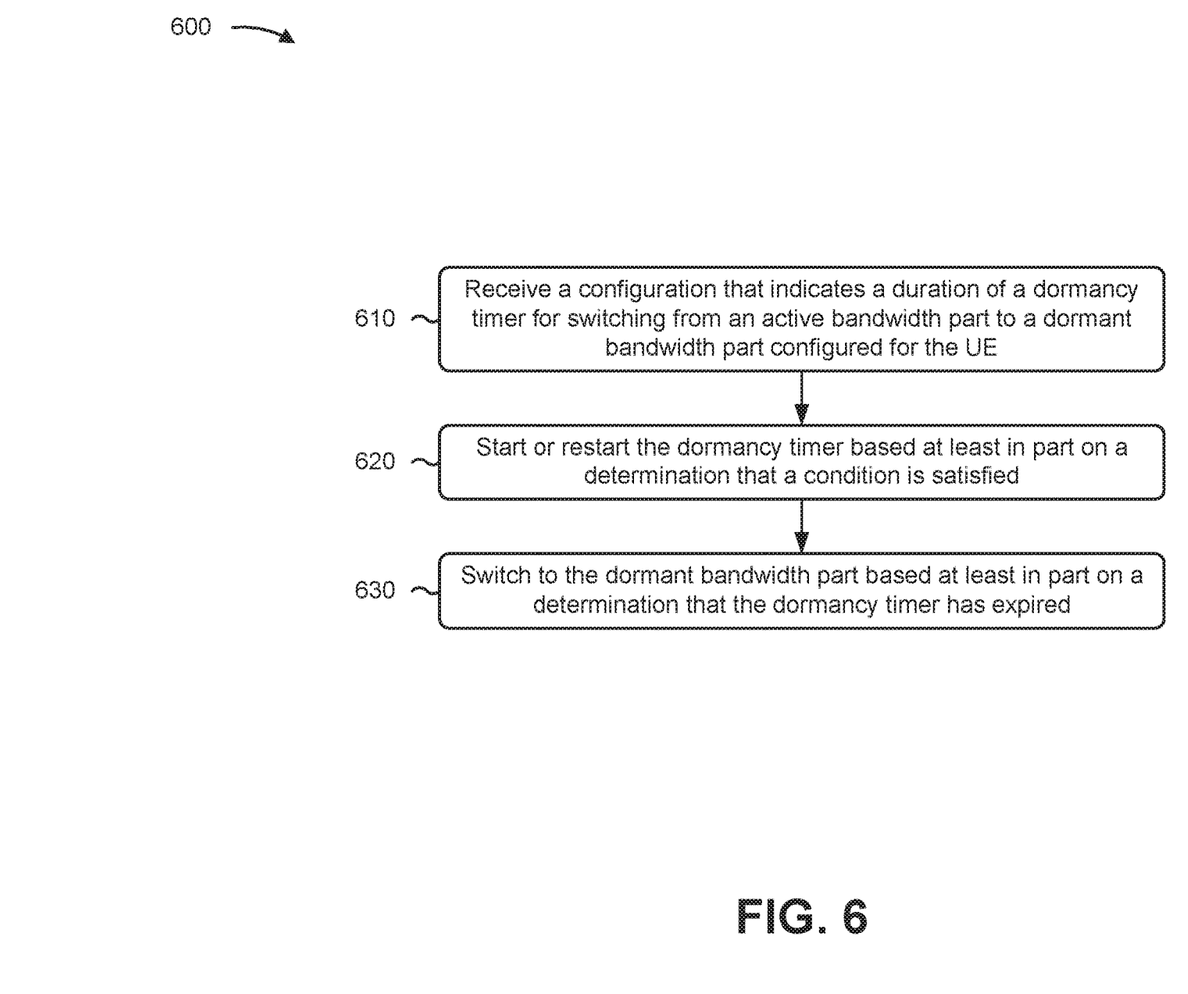
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with using a dormancy timer for switching to a dormant bandwidth part.

As shown in FIG. 6, in some aspects, process 600 may include receiving a configuration that indicates a duration of a dormancy timer for switching from an active bandwidth part to a dormant bandwidth part configured for the UE (block 610). For example, the UE (e.g., using receive processor 258, controller/processor 280, memory 282, and/or the like) may receive a configuration that indicates a duration of a dormancy timer for switching from an active bandwidth part to a dormant bandwidth part configured for the UE, as described above.

As further shown in FIG. 6, in some aspects, process 600 may include starting or restarting the dormancy timer based at least in part on a determination that a condition is satisfied (block 620). For example, the UE (e.g., using controller/processor 280, memory 282, and/or the like) may start or restart the dormancy timer based at least in part on a determination that a condition is satisfied, as described above.

As further shown in FIG. 6, in some aspects, process 600 may include switching to the dormant bandwidth part based at least in part on a determination that the dormancy timer has expired (block 630). For example, the UE (e.g., using receive processor 258, transmit processor 264, controller/processor 280, memory 282, and/or the like) may switch to the dormant bandwidth part based at least in part on a determination that the dormancy timer has expired, as described above.

Process 600 may include additional aspects, such as any single aspect or any combination of aspects described below and/or in connection with one or more other processes described elsewhere herein.

In a first aspect, the configuration is specific to a secondary cell configured for the UE.

In a second aspect, alone or in combination with the first aspect, all bandwidth parts configured in the secondary cell use a same duration of the dormancy timer.

In a third aspect, alone or in combination with one or more of the first and second aspects, the condition includes at least one of: reception of an instruction to switch from the active bandwidth part to a bandwidth part other than the dormant bandwidth part, reception of a physical downlink control channel (PDCCH) communication that includes a downlink assignment or an uplink grant on the active bandwidth part, transmission of a medium access control (MAC) protocol data unit (PDU) for a configured grant communication on the active bandwidth part, reception of a MAC PDU for a semi-persistent scheduling communication on the active bandwidth part, expiration of an inactivity timer for switching from the active bandwidth part to a default bandwidth part of the UE, or a combination thereof.

In a fourth aspect, alone or in combination with one or more of the first through third aspects, process 600 includes stopping the dormancy timer based at least in part on a determination that: the active bandwidth part is the dormant bandwidth part, or the UE is performing a random access procedure for a serving cell.

In a fifth aspect, alone or in combination with one or more of the first through fourth aspects, process 600 includes starting or restarting an inactivity timer for switching to a default bandwidth part of the UE after switching to the dormant bandwidth part.

In a sixth aspect, alone or in combination with one or more of the first through fifth aspects, process 600 includes determining that the dormancy timer and an inactivity timer, for switching to a default bandwidth part of the UE, expire at a same time; switching to the dormant bandwidth part further based at least in part on the determination that the dormancy timer and the inactivity timer have expired at the same time; and starting or restarting the inactivity timer after switching to the dormant bandwidth part.

In a seventh aspect, alone or in combination with one or more of the first through sixth aspects, process 600 includes determining that the dormancy timer and an inactivity timer, for switching to a default bandwidth part of the UE, expire at a same time; switching to the default bandwidth part based at least in part on the determination that the dormancy timer and the inactivity timer have expired at the same time; and starting or restarting the dormancy timer after switching to the default bandwidth part.

In an eighth aspect, alone or in combination with one or more of the first through seventh aspects, the configuration further indicates whether to switch to the dormant bandwidth part or a default bandwidth part of the UE if the dormancy timer and an inactivity timer, for switching to the default bandwidth part, expire at a same time.

In a ninth aspect, alone or in combination with one or more of the first through eighth aspects, process 600 includes determining that a secondary cell, associated with the dormancy timer, has been released or that a deactivation timer associated with the secondary cell has expired; and stopping the dormancy timer based at least in part on the determination that the secondary cell has been released or that the deactivation timer associated with the secondary cell has expired.

In a tenth aspect, alone or in combination with one or more of the first through ninth aspects, the active bandwidth part is a default bandwidth part of the UE or an initial bandwidth part.

In an eleventh aspect, alone or in combination with one or more of the first through tenth aspects, the dormancy timer is configured for a default bandwidth part of the UE or an initial bandwidth part, and not for any other active bandwidth parts of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
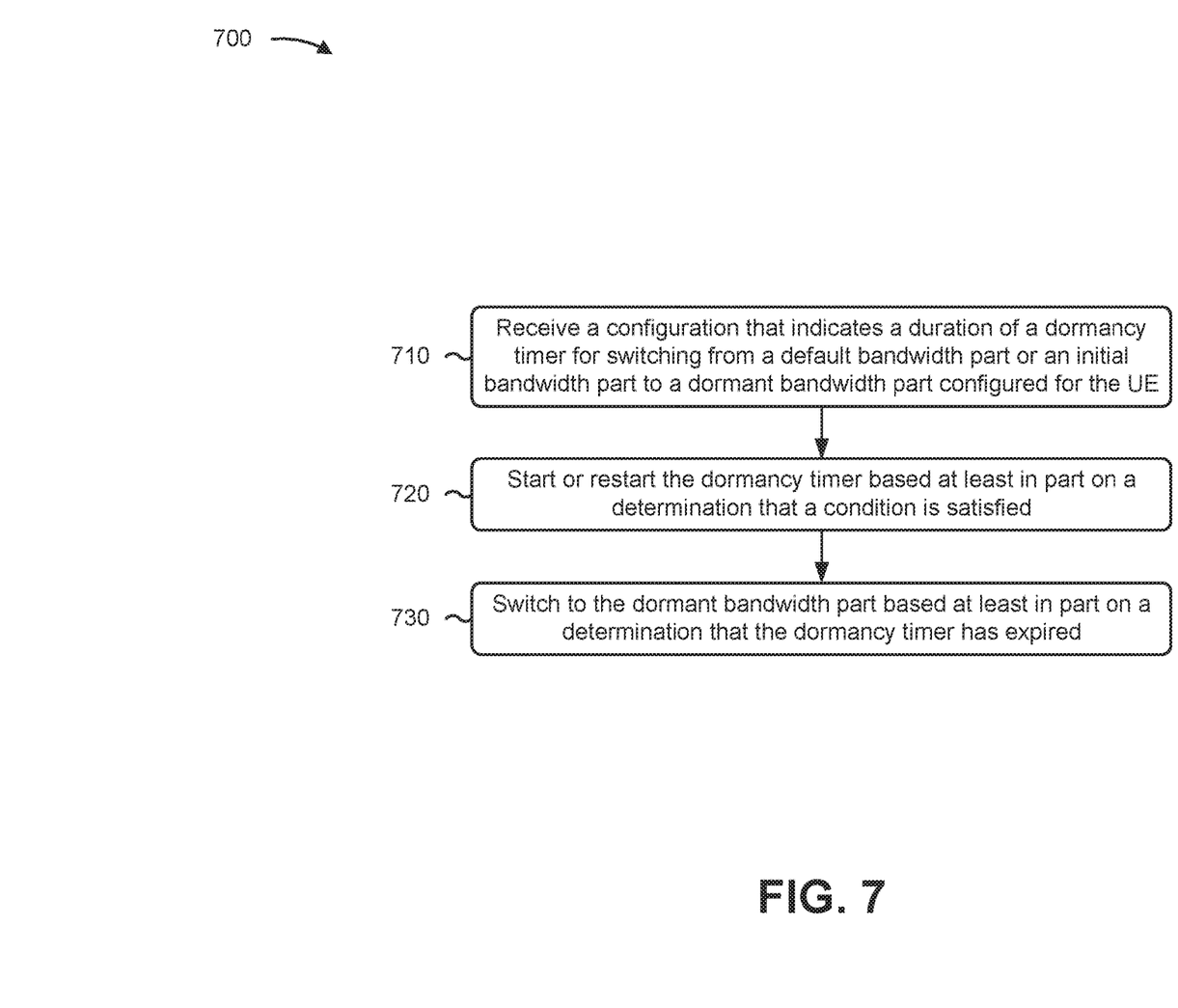
FIG. 7 is a diagram illustrating another example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with using a dormancy timer for switching to a dormant bandwidth part.

As shown in FIG. 7, in some aspects, process 700 may include receiving a configuration that indicates a duration of a dormancy timer for switching from a default bandwidth part or an initial bandwidth part to a dormant bandwidth part configured for the UE (block 710). For example, the UE (e.g., using receive processor 258, controller/processor 280, memory 282, and/or the like) may receive a configuration that indicates a duration of a dormancy timer for switching from a default bandwidth part or an initial bandwidth part to a dormant bandwidth part configured for the UE, as described above.

As further shown in FIG. 7, in some aspects, process 700 may include starting or restarting the dormancy timer based at least in part on a determination that a condition is satisfied (block 720). For example, the UE (e.g., using controller/processor 280, memory 282, and/or the like) may start or restart the dormancy timer based at least in part on a determination that a condition is satisfied, as described above.

As further shown in FIG. 7, in some aspects, process 700 may include switching to the dormant bandwidth part based at least in part on a determination that the dormancy timer has expired (block 730). For example, the UE (e.g., using receive processor 258, transmit processor 264, controller/processor 280, memory 282, and/or the like) may switch to the dormant bandwidth part based at least in part on a determination that the dormancy timer has expired, as described above.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration that indicates a duration of a dormancy timer for switching from an active bandwidth part to a dormant bandwidth part configured for the UE; and
   switching to communicating via the dormant bandwidth part or a default bandwidth part of the UE based at least in part on a determination that the dormancy timer has expired,
      wherein the dormancy timer is configured only for a default bandwidth part of the UE or only for an initial bandwidth part, or
      wherein the switching is based at least in part on a determination that the dormancy timer and an inactivity timer, for switching to the default bandwidth part of the UE, expire at a same time.

2. The method of claim 1, wherein the configuration is specific to a secondary cell configured for the UE.

3. The method of claim 2, wherein all bandwidth parts configured in the secondary cell use a same duration of the dormancy timer.

4. The method of claim 1, wherein a condition for starting or restarting the dormancy timer includes at least one of:
   reception of an instruction to switch from the active bandwidth part to a bandwidth part other than the dormant bandwidth part,
   reception of a physical downlink control channel (PDCCH) communication that includes a downlink assignment or an uplink grant on the active bandwidth part,
   transmission of a medium access control (MAC) protocol data unit (PDU) for a configured grant communication on the active bandwidth part,
   reception of a MAC PDU for a semi-persistent scheduling communication on the active bandwidth part,
   expiration of the inactivity timer, or
   a combination thereof.

5. The method of claim 1, further comprising stopping the dormancy timer based at least in part on a determination that:
   the active bandwidth part is the dormant bandwidth part, or
   the UE is performing a random access procedure for a serving cell.

6. The method of claim 1, further comprising starting or restarting the inactivity timer after switching to communicating via the dormant bandwidth part.

7. The method of claim 1, further comprising:
   determining that the dormancy timer and the inactivity timer expire at the same time; and
   switching to communicating via the dormant bandwidth part further based at least in part on the determination that the dormancy timer and the inactivity timer expire at the same time.

8. The method of claim 1, further comprising:
   determining that the dormancy timer and the inactivity timer expire at the same time; and
   switching to the default bandwidth part based at least in part on the determination that the dormancy timer and the inactivity timer expire at the same time.

9. The method of claim 1, wherein the configuration further indicates whether to switch to communicating via the dormant bandwidth part or the default bandwidth part if the dormancy timer and the inactivity timer expire at the same time.

10. The method of claim 1, further comprising:
    determining that a secondary cell, associated with the dormancy timer, has been released or that a deactivation timer associated with the secondary cell has expired; and
    stopping the dormancy timer based at least in part on the determination that the secondary cell has been released or that the deactivation timer associated with the secondary cell has expired.

11. The method of claim 1, wherein the active bandwidth part is the default bandwidth part or the initial bandwidth part.

12. The method of claim 1, wherein communicating via the dormant bandwidth part comprises performing channel measurement and reporting and refraining from monitoring a control channel.

13. A user equipment (UE) for wireless communication, comprising:
    one or more memories; and
    one or more processors configured to:

receive a configuration that indicates a duration of a dormancy timer for switching from an active bandwidth part to a dormant bandwidth part configured for the UE; and switch to communicating via the dormant bandwidth part or a default bandwidth part of the UE based at least in part on a determination that the dormancy timer has expired, wherein the dormancy timer is configured only for a default bandwidth part of the UE or only for an initial bandwidth part, or wherein the switching is based at least in part on a determination that the dormancy timer and an inactivity timer, for switching to the default bandwidth part of the UE, expire at a same time.

14. The UE of claim 13, wherein the configuration is specific to a secondary cell configured for the UE.

15. The UE of claim 14, wherein all bandwidth parts configured in the secondary cell use a same duration of the dormancy timer.

16. The UE of claim 13, wherein a condition for starting or restarting the dormancy timer includes at least one of:
reception of an instruction to switch from the active bandwidth part to a bandwidth part other than the dormant bandwidth part,
reception of a physical downlink control channel (PDCCH) communication that includes a downlink assignment or an uplink grant on the active bandwidth part,
transmission of a medium access control (MAC) protocol data unit (PDU) for a configured grant communication on the active bandwidth part,
reception of a MAC PDU for a semi-persistent scheduling communication on the active bandwidth part,
expiration of the inactivity timer, or
a combination thereof.

17. The UE of claim 13, wherein the one or more processors are further configured to stop the dormancy timer based at least in part on a determination that:
the active bandwidth part is the dormant bandwidth part, or
the UE is performing a random access procedure for a serving cell.

18. The UE of claim 13, wherein the one or more processors are further configured to:

determine that the dormancy timer and the inactivity timer expire at the same time; and switch to communicating via the dormant bandwidth part or the default bandwidth part based at least in part on the determination that the dormancy timer and the inactivity timer expire at the same time.

19. A non-transitory computer-readable medium storing one or more instructions for wireless communication, the one or more instructions comprising:
one or more instructions that, when executed by one or more processors of a user equipment (UE), cause the one or more processors to:
receive a configuration that indicates a duration of a dormancy timer for switching from an active bandwidth part to a dormant bandwidth part configured for the UE; and switch to communicating via the dormant bandwidth part or a default bandwidth part of the UE based at least in part on a determination that the dormancy timer has expired, wherein the dormancy timer is configured only for a default bandwidth part of the UE or only for an initial bandwidth part, or wherein the switching is based at least in part on a determination that the dormancy timer and an inactivity timer, for switching to the default bandwidth part of the UE, expire at a same time.

20. An apparatus for wireless communication, comprising:
means for receiving a configuration that indicates a duration of a dormancy timer for switching from an active bandwidth part to a dormant bandwidth part configured for the apparatus; and means for switching to communicating via the dormant bandwidth part or a default bandwidth part of the apparatus based at least in part on a determination that the dormancy timer has expired, wherein the dormancy timer is configured only for a default bandwidth part of the apparatus or only for an initial bandwidth part, or wherein the switching is based at least in part on a determination that the dormancy timer and an inactivity timer, for switching to the default bandwidth part of the apparatus, expire at a same time.

* * * * *